(12) United States Patent
Hamaoka et al.

(10) Patent No.: US 10,843,782 B2
(45) Date of Patent: Nov. 24, 2020

(54) SHIP

(71) Applicant: Yanmar Co., Ltd., Osaka (JP)

(72) Inventors: Shunji Hamaoka, Osaka (JP); Tetsuya Yokoyama, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/333,722

(22) PCT Filed: Jul. 4, 2017

(86) PCT No.: PCT/JP2017/024464
§ 371 (c)(1),
(2) Date: Mar. 15, 2019

(87) PCT Pub. No.: WO2018/051612
PCT Pub. Date: Mar. 22, 2018

(65) Prior Publication Data
US 2019/0270500 A1 Sep. 5, 2019

(30) Foreign Application Priority Data
Sep. 16, 2016 (JP) .................................. 2016-181596

(51) Int. Cl.
*B63H 21/32* (2006.01)
*B01D 53/94* (2006.01)
(Continued)

(52) U.S. Cl.
CPC ............. *B63H 21/32* (2013.01); *B01D 53/94* (2013.01); *F01N 3/24* (2013.01); *F01N 3/28* (2013.01)

(58) Field of Classification Search
CPC ...... B01D 2258/012; B01D 2259/4566; B01D 53/8631; B01D 53/94; B63H 21/32; F01N 3/24; F01N 3/28
See application file for complete search history.

(56) References Cited

U.S. PATENT DOCUMENTS

| 10,344,656 B2 * | 7/2019 | Doring ............... B01D 53/9431 |
| 2012/0269705 A1* | 10/2012 | Jensen .................... F01N 3/208 423/212 |
| 2016/0348558 A1* | 12/2016 | Garduno ............... F01N 3/2066 |

FOREIGN PATENT DOCUMENTS

| JP | 1-294909 A | 11/1989 |
| JP | 2009-180181 A | 8/2009 |

(Continued)

OTHER PUBLICATIONS

International Search Report dated Sep. 5, 2017 issued in corresponding PCT Application PCT/JP2017/024464.

*Primary Examiner* — Anthony Ayala Delgado
(74) *Attorney, Agent, or Firm* — Norton Rose Fulbright US LLP (57) ABSTRACT

A ship including a plurality of engines and a plurality of exhaust gas purifiers provided on respective exhaust paths for exhaust gas from the engines. Each exhaust gas purifier includes a casing and an opening. The casing accommodates a purification catalyst for purifying the exhaust gas. The opening serves to place the purification catalyst into or displace the purification catalyst from the casing. The exhaust gas purifiers are arranged so that the respective openings of the exhaust gas purifiers face an identical space, and operation directions of an operation performed through the openings in at least two of the exhaust gas purifiers cross.

20 Claims, 10 Drawing Sheets

(51) Int. Cl.
    *F01N 3/28*    (2006.01)
    *F01N 3/24*    (2006.01)

(56)            References Cited

FOREIGN PATENT DOCUMENTS

JP      2011-017314 A      1/2011
JP      2015-086726 A      5/2015
WO      WO-2012168540 A1 * 12/2012  ......... F01N 13/0097

* cited by examiner

SHIP

CROSS REFERENCES TO RELATED APPLICATIONS

This application is a national stage application pursuant to 35 U.S.C. § 371 of International Application No. PCT/JP2017/024464, filed on Jul. 4, 2017 which claims priority under 35 U.S.C. § 119 to Japanese Patent Application No. 2016-181596 filed on Sep. 16, 2016, the disclosures of which are hereby incorporated by reference in their entireties.

TECHNICAL FIELD

The present invention relates to a ship with exhaust gas purifiers provided on exhaust paths of engines.

BACKGROUND ART

In a known conventional exhaust purifier, to reduce nitrogen oxide (NOx) contained in exhaust emitted from an internal combustion engine, a selective-reduction-type NOx catalyst (SCR catalyst) is provided in an exhaust pipe and NOx is reduced to nitrogen and water by using ammonia as a reducer. For example, Patent Literature 1 (hereinafter, PTL1) discloses an exhaust gas purifier in which urea water is supplied from a urea water injection nozzle into an exhaust pipe to generate ammonia from the urea water by using the heat of the exhaust, and then NOx is reduced to nitrogen and water. Described therein is a configuration where exhaust gas purifiers are arranged so that the number of the exhaust gas purifiers is identical to the number of arranged internal combustion engines.

CITATION LIST

Patent Literature

PTL1: Japanese Patent Application Laid-Open No. 2015-86726

SUMMARY OF INVENTION

Technical Problem

If a ship is equipped with a plurality of main engines, which serve as a driving source for moving the ship, and with a plurality of dynamo engines, which serve as a complement to inboard power, a moving distance taken in moving to an operation area for each exhaust gas purifier can be long and an operation can require time and effort, depending on the locations of the exhaust gas purifiers. Such moving occurs when a maintenance or administration operation, such as placement of a purification catalyst, maintenance, or the like, is performed.

The present invention is aimed at providing techniques for shortening a moving distance taken for a maintenance or administration operation of a plurality of exhaust gas purifiers.

Solution to Problem

A ship includes a plurality of engines, and exhaust gas purifiers provided on respective exhaust paths for exhaust gas from the engines, the exhaust gas purifier including a casing and an opening, the casing accommodating a purification catalyst for purifying the exhaust gas, the opening serving to place the purification catalyst into or displace the purification catalyst from the casing, the exhaust gas purifiers being arranged so that the respective openings of the exhaust gas purifiers face an identical space and operation directions of an operation performed through the openings in at least two of the exhaust gas purifiers cross.

In a preferred aspect of the present invention, the exhaust gas purifier is arranged in layers above and below a deck of the ship.

In another preferred aspect of the present invention, the exhaust gas purifiers are fixed using a fixing member for integrally installing the exhaust gas purifiers, the fixing member includes a fixing hole for fixing each of the exhaust gas purifiers, and the exhaust gas purifier is fixed in the ship by using the fixing member in a state where the exhaust gas purifier is fixed in the fixing hole of the fixing member.

Advantageous Effects of Invention

The present invention provides a possibility of shortening a moving distance taken for a maintenance or administration operation of an exhaust gas purifier.

DESCRIPTION OF EMBODIMENTS

Figure 1:
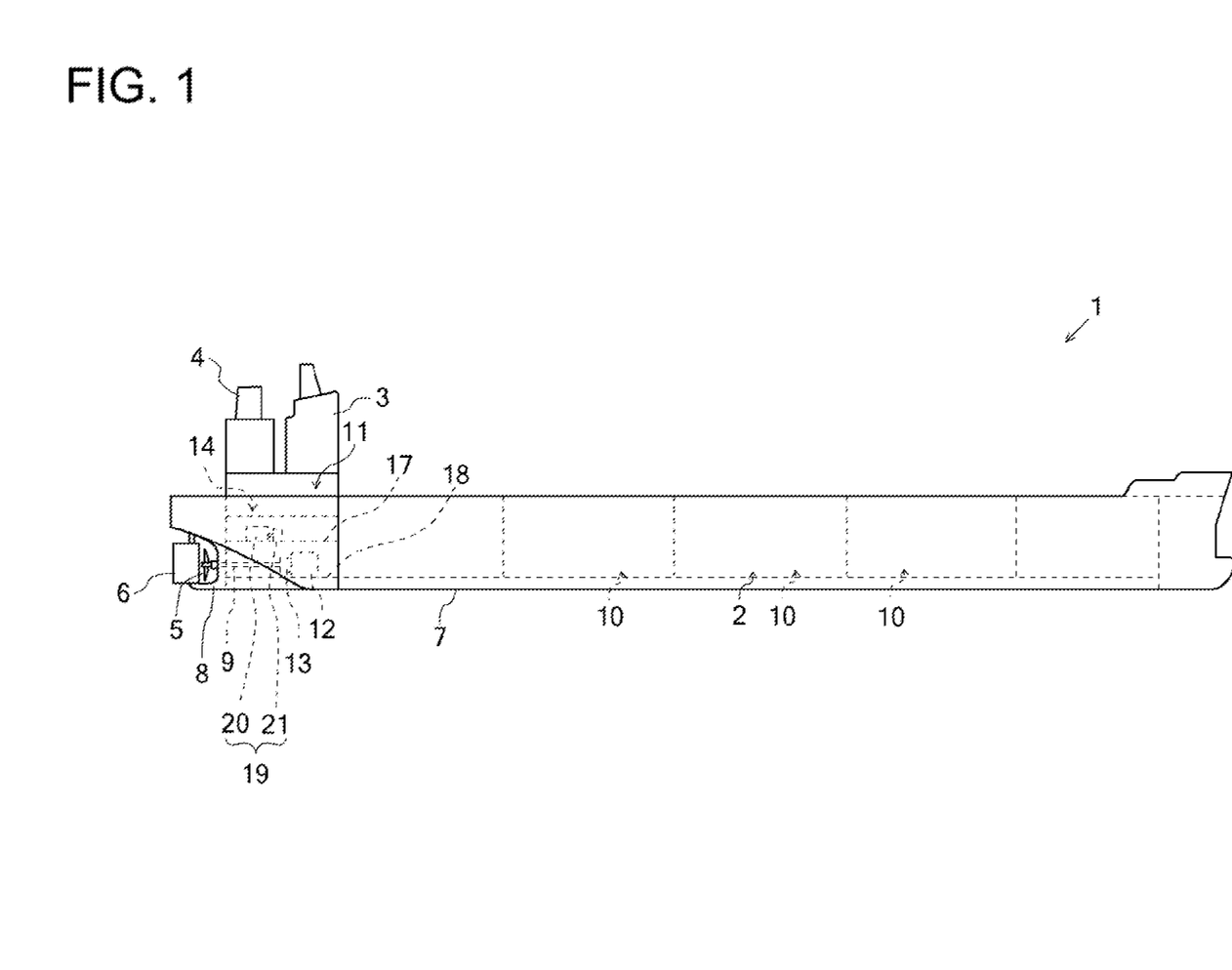
FIG. 1 A side view of a ship.
Figure 2:
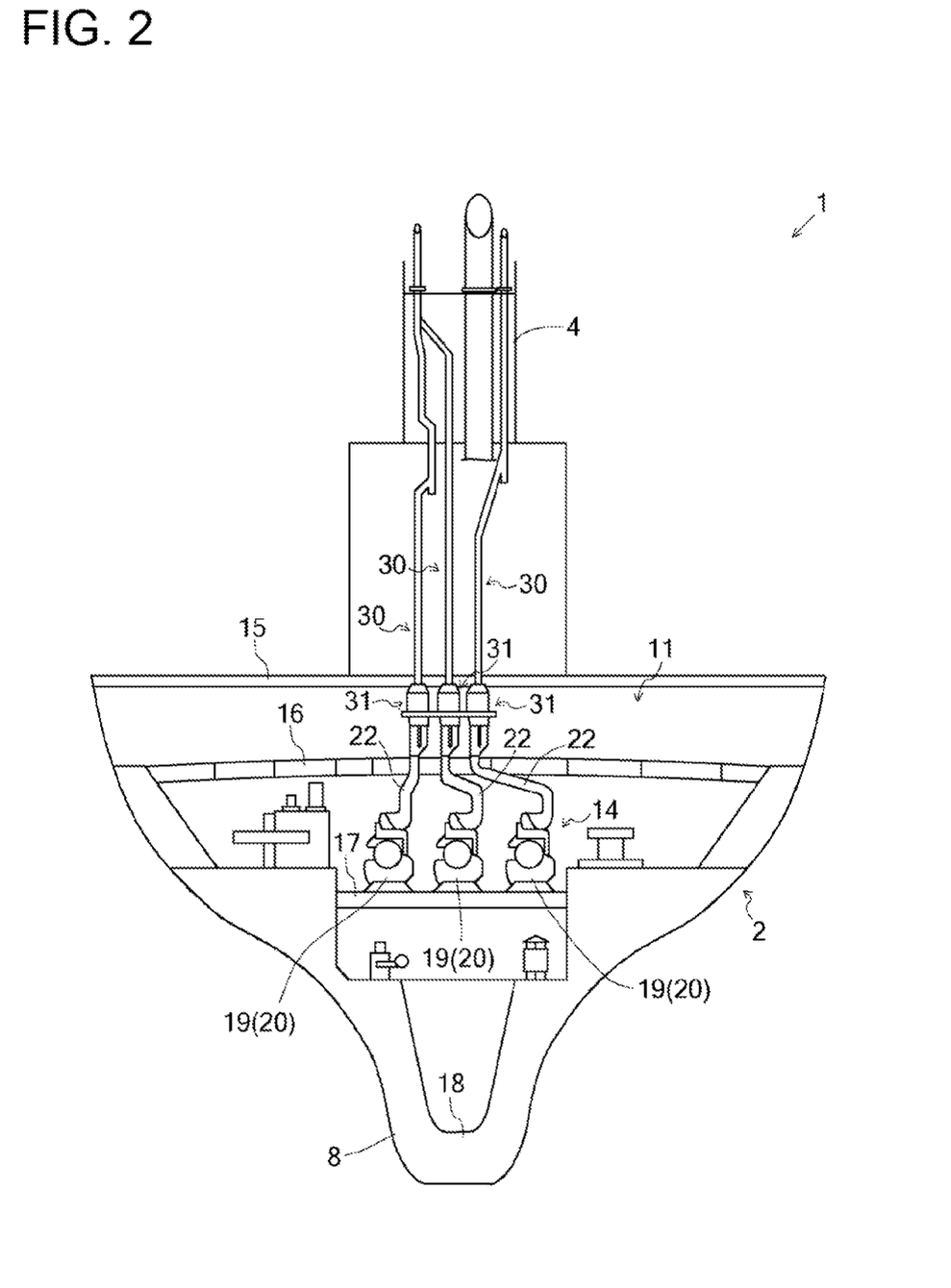
FIG. 2 A diagram illustrating the inside of an engine room of the ship.

First, a ship is described with reference to FIGS. 1 and 2. FIG. 1 is a side view illustrating an overall configuration of a ship 1. FIG. 2 illustrates the inside of an engine room of the ship 1, depicting engines and exhaust paths of the engine.

The ship 1 includes a hull 2, a cabin 3, a funnel 4, propellers 5, and a rudder 6. The cabin 3 is provided toward the stern of the hull 2. The funnel 4 is located behind the cabin 3. The propellers 5 and the rudder 6 are provided in a lower portion of the stern of the hull 2. In a ship bottom 7 toward the stern, a skeg 8 is formed integrally. A thrust shaft 9 for rotationally driving the propellers 5 is pivotally supported by the skeg 8. In the hull 2, holds 10 are provided toward the bow and in a central portion while an engine room 11 is provided toward the stern.

In the engine room 11, a main engine 12 (a diesel engine in the present embodiment) as a driving source for the propellers 5, a reduction gear 13, and a power generator 14 for supplying power to an electric system in the hull 2 are arranged. The rotational motive force conveyed from the main engine 12 via the reduction gear 13 rotationally drives the propellers 5. The inside of the engine room 11 is divided into upper and lower portions by an upper deck 15, a second deck 16, a third deck 17, and an inner bottom plating 18. In the present embodiment, the main engine 12 and the reduction gear 13 are installed on the inner bottom plating 18 at the lowermost stage of the engine room 11 while the power generator 14 is installed on the third deck 17 at an intermediate stage of the engine room 11.

The power generator 14 includes a plurality of diesel generators 19 (three diesel generators 19 in the present embodiment). Each diesel generator 19 is made up of a combination of a dynamo engine 20 and a generator 21 that generates power with the dynamo engine 20 being driven.

An intake path (not illustrated) for air intake and an exhaust path 30 for exhaust gas emission are connected to each dynamo engine 20. Air taken in through the intake path is delivered to each cylinder of the dynamo engine 20. Before or after completion of a compression stroke of each cylinder, fuel sucked up from a fuel tank is forcibly delivered by a fuel injection unit into respective combustion chambers of the cylinders. Subsequently, an expansion stroke accompanied by self-ignition combustion of a gaseous mixture is performed in each combustion chamber.

The exhaust path 30 extends to the funnel 4 to come into direct communication with the outside. The number of the exhaust paths 30 prepared is identical to the number of the dynamo engines 20. In the present embodiment, the three exhaust paths 30 are provided so as to correspond to the three dynamo engines 20. Each exhaust path 30 is provided with an exhaust gas purifier 31, which purifies the exhaust gas emitted from the dynamo engine 20. That is, the exhaust gas from each dynamo engine 20 is emitted outside after being purified through the exhaust gas purifier 31. Each exhaust gas purifier 31 is installed on the second deck 16.

Figure 3:
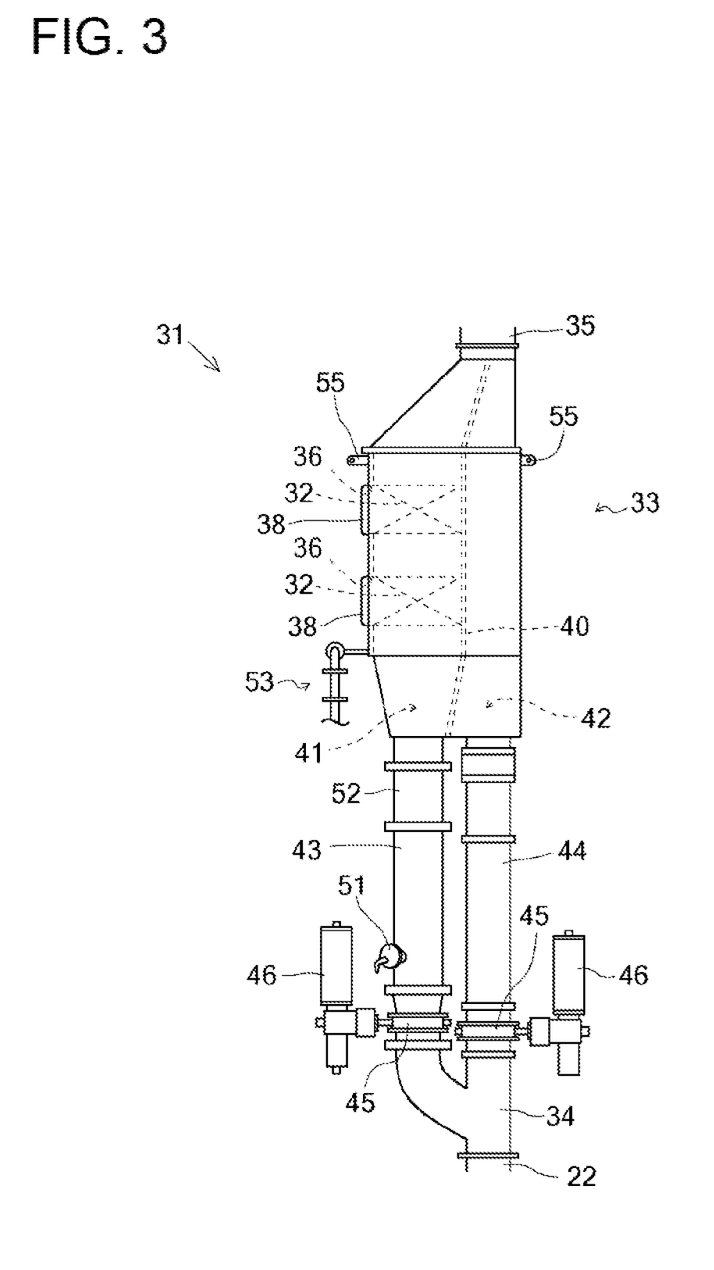
FIG. 3 A side view of an exhaust gas purifier.
Figure 4:
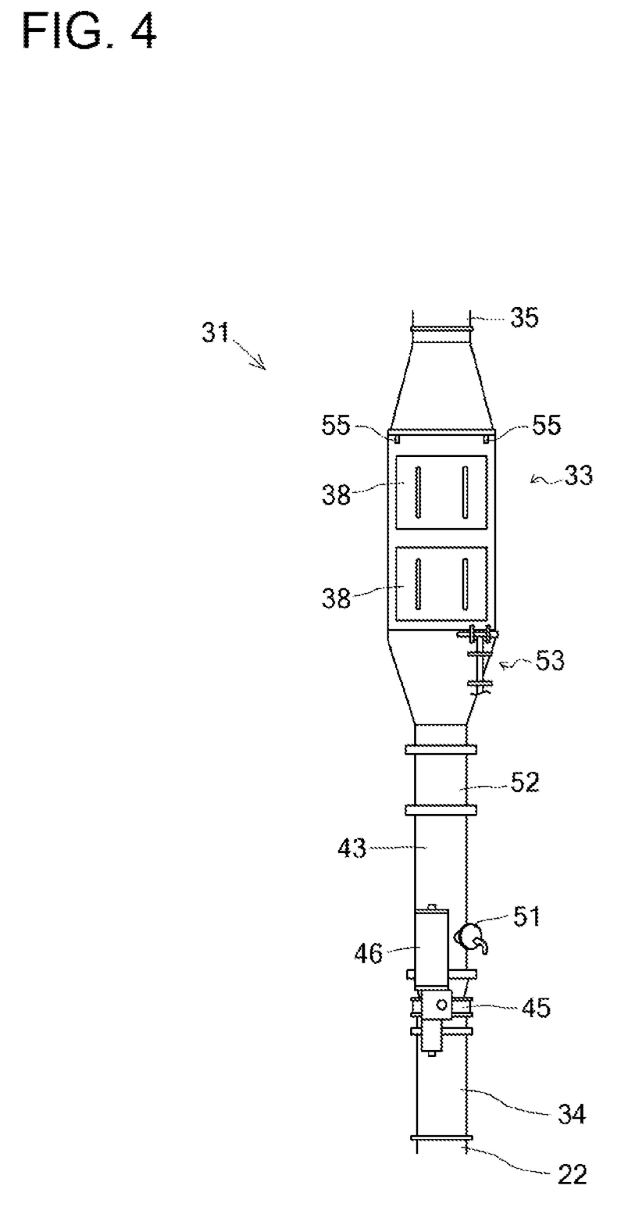
FIG. 4 A front view of the exhaust gas purifier.
Figure 5:
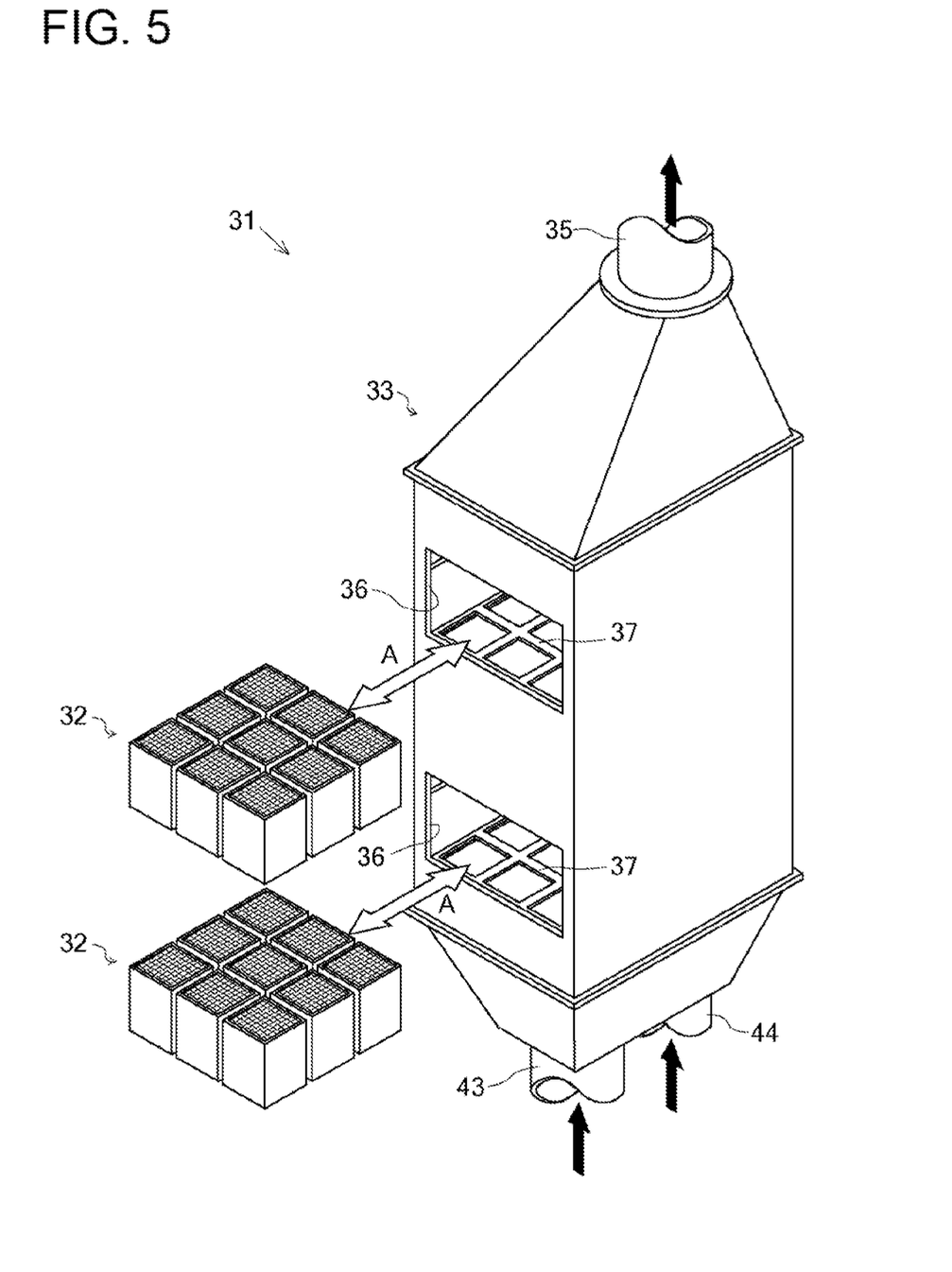
FIG. 5 A perspective view illustrating operation directions relative to the exhaust gas purifier.

A configuration of the exhaust gas purifier is described next with reference to FIGS. 3 to 5. FIG. 3 is a side view of the exhaust gas purifier 31. FIG. 4 is a front view of the exhaust gas purifier 31. FIG. 5 is a perspective view illustrating operation directions A in which an operation is performed for the exhaust gas purifier 31.

The exhaust gas purifier 31 is configured to purify exhaust emitted from an engine (the dynamo engine 20). The number of the provided exhaust gas purifiers 31 is identical to the number of engines. The exhaust gas purifier 31 purifies exhaust gas emitted from corresponding one of the engines. The exhaust gas purifier 31 includes a casing 33, which accommodates a NOx catalyst 32 for selectively reducing NOx contained in exhaust gas, an inlet-side pipe 34 for guiding exhaust gas emitted from the dynamo engine 20 into the casing 33, and an outlet-side pipe 35 for guiding the exhaust gas that has passed through the casing 33.

The casing 33 is a member made of a heat-resistant metallic material and is shaped approximately like a tube (in the present embodiment, a prismatic tube having a front surface, a back surface, and side surfaces). A partition plate 40 is provided in the casing 33. The partition plate 40 divides the inside of the casing 33 along the flow direction of exhaust gas (the longitudinal direction on each of the illustrations in the drawings). The partition plate 40 partitions the inside of the casing 33 into a main passage 41 and a bypass passage 42. The main passage 41 runs through the NOx catalysts 32. The bypass passage 42 avoids the NOx catalysts 32. The partition plate 40 is provided from an inlet-side end to an outlet-side end of the casing 33. By providing the partition plate 40 to partition the inside of the casing 33, the heat of the exhaust gas that passes through the bypass passage 42 can be used to warm the NOx catalysts 32 arranged in the main passage 41. In the present embodiment, in the casing 33, the side on which the main passage 41 (the NOx catalyst 32) is positioned is defined as the front of the casing 33 and the side on which the bypass passage 42 is positioned is defined as the back of the casing 33.

The inlet-side pipe 34 connects an exhaust pipe 22 of the dynamo engine 20 to the casing 33. The inlet-side pipe 34 is a bifurcated pipe that connects the exhaust pipe 22 to both the main passage 41 and the bypass passage 42 that are formed in the casing 33. The inlet-side pipe 34 branches into a main-passage-side pipe 43 connected to the main passage 41 and a bypass-passage-side pipe 44 connected to the bypass passage 42.

The main-passage-side pipe 43 and the bypass-passage-side pipe 44 are each provided with a switching valve 45 and a valve actuator 46 as path switching members for switching the flow direction of exhaust gas. The valve actuators 46 actuate the respective switching valves 45. In the inlet-side pipe 34, the valve actuator 46 is activated to operate the switching valve 45. Accordingly, exhaust gas from the exhaust pipe 22 can be selectively guided to the main passage 41 or the bypass passage 42. The valve actuators 46 provided for the switching valves 45 of the main-passage-side pipe 43 and the bypass-passage-side pipe 44 may be arranged toward the front surface, the back surface, or a side surface of the casing 33. The arrangement can be set as desired at the time of determining the layout of the plurality of exhaust gas purifiers 31.

Downstream of the switching valve 45 of the main-passage-side pipe 43, a urea water injection nozzle 51 and a mixer 52 are arranged. The urea water injection nozzle 51 supplies urea water to exhaust gas as a reducer supplying unit. The mixer 52 mixes the supplied urea water and the exhaust gas. The reducer supplying unit includes an unillustrated urea water tank, an unillustrated feed pump, an unillustrated injection volume controller, and the like in addition to the urea water injection nozzle 51. On activation of the feed pump, urea water is delivered from the urea water tank to the urea water injection nozzle 51. The urea water injection nozzle 51 ejects the urea water in the form of mist to exhaust gas. The ejected urea water has a volume based on the injection volume set by the injection volume controller.

The exhaust gas guided by the main-passage-side pipe 43 reaches the mixer 52, containing the urea ejected from the urea water injection nozzle 51. During this time, hydrolytic degradation of the urea starts and the urea generates ammonia. The mixer mixes the ammonia with the exhaust gas sufficiently. Thus, the exhaust gas and the ammonia mixed by the mixer 52 are guided by the main passage 41 of the casing 33 to be delivered to the NOx catalysts 32.

The NOx catalyst 32 is a purification catalyst that purifies the exhaust gas delivered to the main passage 41 by selectively reducing NOx in the exhaust gas with ammonia serving as a reducer. The NOx catalyst 32 is made from a material containing an ingredient, such as alumina, vanadia, titania, zeolite, or the like. The NOx catalyst 32 is made up of a plurality of members or a single member in the shape of an approximately rectangular parallelepiped. The member has a honeycomb structure with a large number of through-holes formed along the flow direction of the exhaust gas. The NOx contained in the exhaust gas guided to the NOx catalyst 32 in the main passage 41 comes into contact with the NOx catalyst 32 and reacts with the ammonia. Accordingly, the NOx is reduced to nitrogen and water. The exhaust gas purified through the NOx catalysts 32 is delivered from the casing 33 to the outlet-side pipe 35 to be emitted outside through the exhaust path 30.

In the present embodiment, the NOx catalysts 32 are provided in two layers in the main passage 41. However, a purification catalyst provided in the exhaust gas purifier 31 is not limited to this example as long as the function of purifying NOx contained in exhaust gas can be exerted. For example, it is also conceivable to provide a slip processing catalyst as a reducer for NOx for reducing ammonia downstream of the NOx catalysts 32 or to change the number of layers for arranging the NOx catalysts 32.

The exhaust gas guided by the bypass-passage-side pipe 44 subsequently passes through the bypass passage 42 in the casing 33 to be delivered to the outlet-side pipe 35 and then emitted outside through the exhaust path 30. Depending on the specifications of the engine or ship, such a bypass passage may be omitted.

A soot blower 53 is provided upstream of the NOx catalysts 32 in the main passage 41. The soot blower 53 removes smoke and dust that have adhered to the NOx catalysts 32. The soot blower 53 is attached so as to face into the main passage 41 from the front surface of the casing 33. The soot blower 53 includes a nozzle and an injection valve. The nozzle ejects pressurized air. The injection valve allows communication for or interrupts a passage of the pressurized air. The nozzle is connected to a tank that stores the pressurized air with the injection valve interposed therebetween.

A plurality of lifting metal fittings 55 are provided in an upper portion of the casing 33. Two of the lifting metal fittings 55 are attached in each of upper portions of two surfaces (the front surface and the back surface) of the casing 33. The total number of the lifting metal fittings 55 is four. The two surfaces are positioned parallel to each other. The lifting metal fittings 55 are used in installing the casing 33, that is, the exhaust gas purifier 31. For example, in an assembly factory of the ship 1, the installation into the engine room 11 can be facilitated by retaining the lifting metal fittings 55 on hooks of a chain block and then raising or lowering the casing 33 using the chain block.

Openings 36 are provided in the casing 33 so as to come into communication with the main passage 41. The openings 36 serve to place the NOx catalysts 32 into or displace the NOx catalysts 32 from the casing 33. The openings 36 are formed according to the height and width of the Nox catalysts 32. Holding members 37 for holding the NOx catalysts 32 are provided in the openings 36. Thus, access to the NOx catalyst 32 through the opening 36 is enabled. For example, it is possible to place the NOx catalysts 32 in the casing 33 and arrange the NOx catalysts 32 in the main passage 41, to displace the NOx catalysts 32 from the casing 33, and to inspect the NOx catalysts 32. In using the exhaust gas purifier 31, the openings 36 are shut with lids 38 attached to the opening 36. The lids 38 can be detached from the casing 33.

The openings 36 are provided in the front surface of the casing 33. Their opening directions are orthogonal to the front surface of the casing 33. Accordingly, as illustrated in FIG. 5, the operation directions A are in the opening directions of the openings 36. In the operation directions A, a maintenance or administration operation, such as insertion, removal, inspection, or maintenance of the NOx catalysts 32 through the openings 36 is performed for the NOx catalyst 32. The operation directions A are the directions in which the inside of the casing 33 is accessed through the openings 36. In other words, the direction of an operation through the opening 36 relative to the exhaust gas purifier 31 is in the depth direction of the NOx catalyst 32 accommodated in the casing 33.

Figure 6:
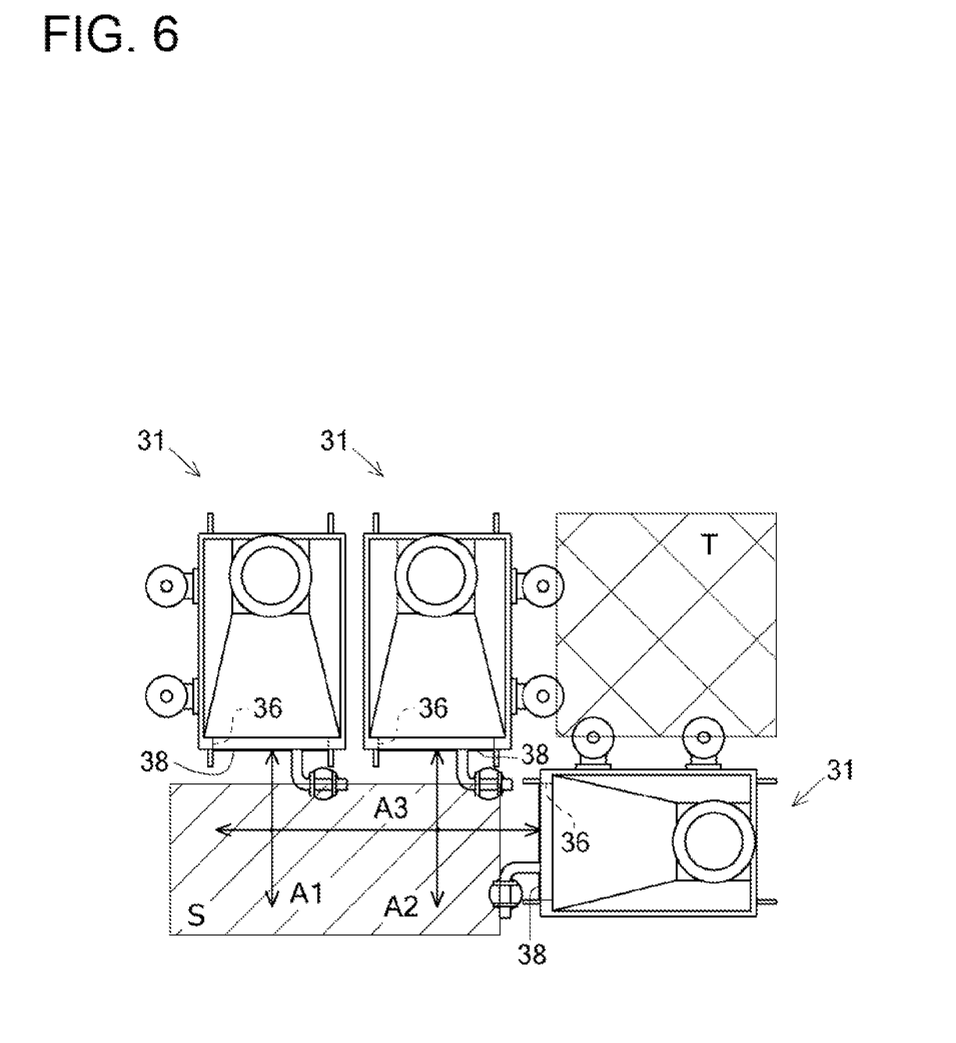
FIG. 6 A plan view illustrating the arrangement of a plurality of exhaust gas purifiers.
Figure 7:
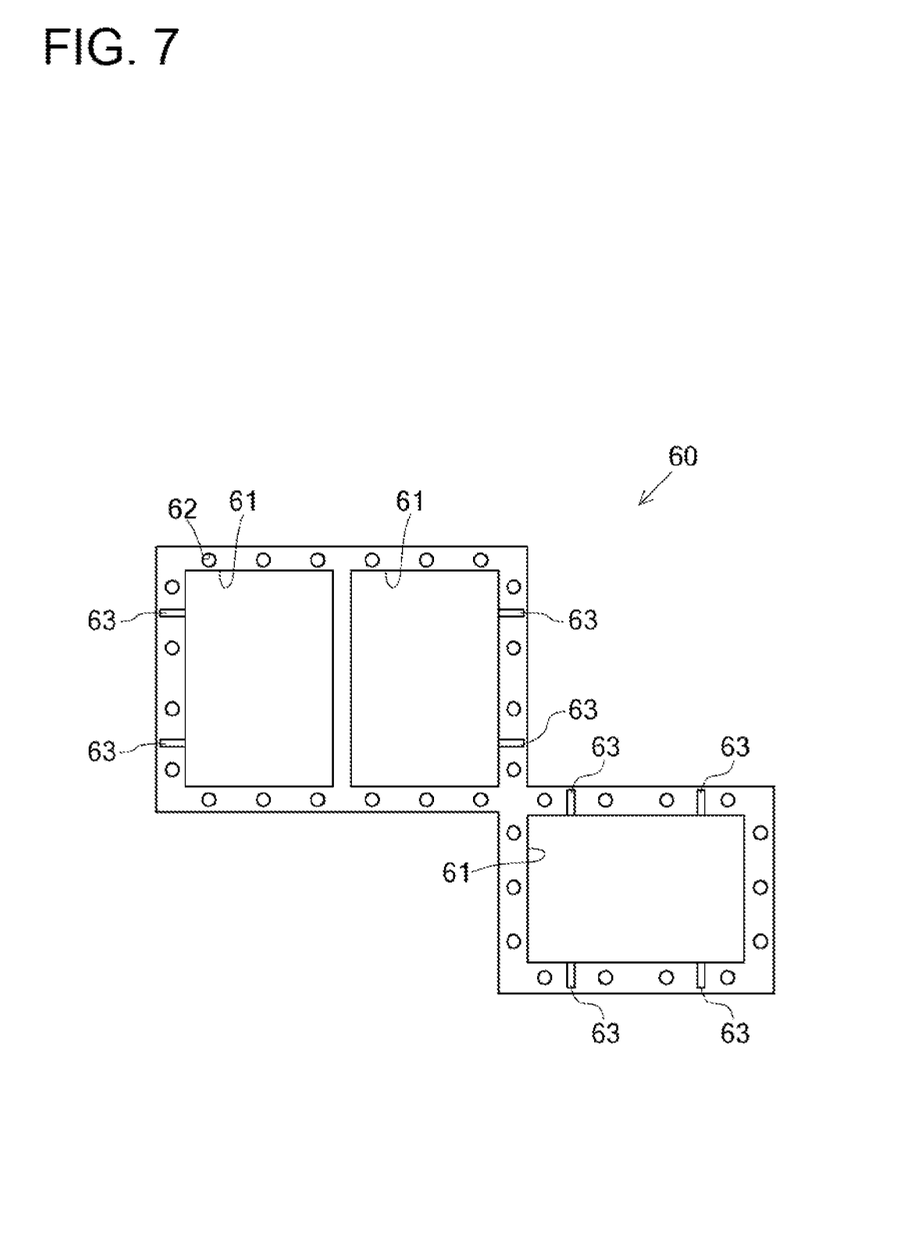
FIG. 7 A diagram illustrating a fixing member used in installing the plurality of exhaust gas purifiers.

A layout of the plurality of exhaust gas purifiers is described next with reference to FIGS. 6 and 7. FIG. 6 is a plan view illustrating an embodiment in which three exhaust gas purifiers 31 are arranged in the shape of L. FIG. 7 illustrates a fixing member 60 used in installing the three exhaust gas purifiers 31.

As illustrated in FIG. 6, two of the exhaust gas purifiers 31 are arranged so as to be adjacent each other while one of the exhaust gas purifiers 31 is arranged on a side thereof. The front surfaces of the exhaust gas purifiers 31, that is, the surfaces on the side toward which the NOx catalysts 32 are arranged to face an identical space S. In other words, the openings 36 (the lids 38) of the casing 33 of the exhaust gas purifiers 31 are positioned so as to face the common space S. As described above, the operation directions A relative to the exhaust gas purifier 31 are orthogonal to the front surface of the casing 33 in which the openings 36 are provided. Operation directions A1 and A2 of two adjacent ones of the exhaust gas purifiers 31 and an operation direction A3 of one of the exhaust gas purifiers 31 arranged on a side are caused to cross in the identical space S. That is, the operation directions of at least two of the exhaust gas purifiers 31 are caused to cross.

Thus, the plurality of exhaust gas purifiers 31 are laid out so that the respective openings 36 of the exhaust gas purifiers 31 face the identical space S and the operation directions in which the NOx catalysts 32 are inserted, removed, or inspected through the openings 36 cross. Accordingly, a maintenance or administration space for performing maintenance or administration of the plurality of exhaust gas purifiers 31 can be shared. Further, an operation can be performed in the identical space S without necessity of moving for a long distance. Consequently, a moving distance taken in performing an operation for the exhaust gas purifiers 31 can be shortened. In addition, decreasing the space S as an operation area can reduce restrictions on space caused by the installation of the exhaust gas purifiers 31 and can contribute to space saving. Particularly in the present embodiment, a more compact layout can be attained by arranging the exhaust gas purifiers 31 so that their operation directions cross in the identical space S.

The space S as an operation area for performing an operation, such as inspection or the like, for each exhaust gas purifier 31 is essential in installing the exhaust gas purifiers 31. In contrast, a region T that does not face the front surfaces of the exhaust gas purifiers 31 and is on the back side of the operation area is a space that allows desired layouts. For example, various kinds of piping, various kinds of wiring, and the like of an engine can be arranged as desired in the region T. As described above, the layout according to the present embodiment affords efficient utilization of a limited space in the engine room 11. This is because a moving distance taken for a maintenance or administration operation can be shortened while a region needed for the installation can be minimized.

The three exhaust gas purifiers 31 arranged as described above are installed integrally in a space over the second deck 16 by using the fixing member 60 illustrated in FIG. 7. The fixing member 60 is a plate-like member and has a shape obtained by shifting two rectangular plate materials and combining the shifted plate materials (a shape like a crank). The fixing member 60 includes three independent fixing holes 61, which serve to support the bottom portions of their casings 33, in positions corresponding to the arrangement of the three exhaust gas purifiers 31. Examples of a method for fixing the casing 33 in the fixing hole 61 include a method of fitting the bottom portion of the casing 33 in the fixing hole 61 and a method of forming a flange larger than the fixing hole 61 in the bottom portion of the casing 33 and joining the flange to the fixing hole 61. A plurality of installation holes 62 and a plurality of strengthening ribs 63 are provided in an edge portion of the fixing member 60. The installation holes 62 allow bolts for installation to be inserted therein. The ribs 63 are fixed to lower side surfaces of the casings 33. The number of the installation holes 62 is not limited as long as the exhaust gas purifiers 31 can be fixed with the fixing members 60 sufficiently. The size, the number, and the like of the ribs 63 are not limited, either, as long as the casings 33 can be fixed sufficiently. If unnecessary, the ribs 63 may be omitted.

Thus, the fixing member 60 is used to couple the three exhaust gas purifiers 31 and install the three exhaust gas purifiers 31 integrally. Accordingly, compared with a case where the exhaust gas purifiers 31 are installed individually, the number of members needed can be further decreased. As a result, space can be saved.

The soot blower 53 or the like is provided on the front surface of the casing 33 except its adjacent surfaces. Accordingly, in arranging each exhaust gas purifier 31, the exhaust gas purifier 31 can be placed easily without being bottlenecked by the soot blower 53 or the like in the layout. As a result, space can be saved. Further, the reducer supplying unit, which is provided for the inlet-side pipe 34 of the casing 33, and the switching valve 45 are arranged on a side surface of each casing 33 except adjacent surfaces of the casings 33. As a result, space can be saved.

The fixing member for fixing the plurality of exhaust gas purifiers 31 integrally is not limited to the above-described fixing member 60. The plurality of exhaust gas purifiers 31 can be coupled and supported. Further, other embodiments can be employed as long as they include bolt holes for installation. For example, if cavities are formed instead of the fixing holes 61 for supporting the bottom portions of the casings 33 by combining L steel and H steel and the plurality of installation holes 62 are formed to surround the cavities, the function similar to that of the fixing member 60 can be exerted.

Figure 8:
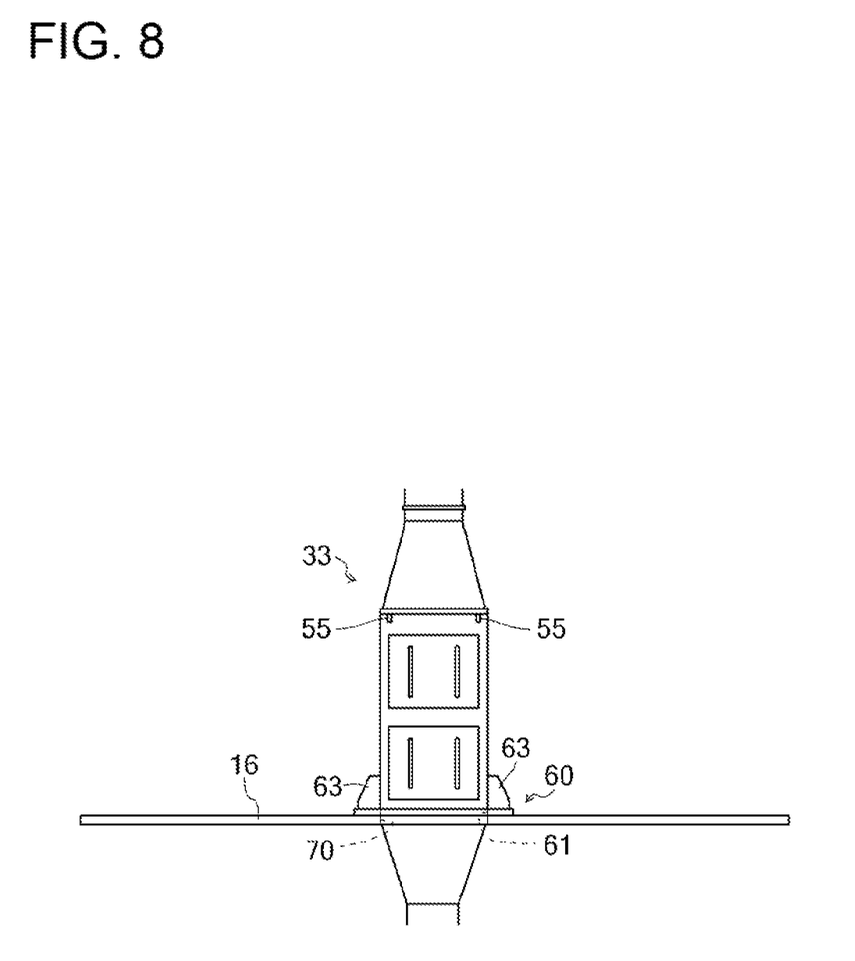
FIG. 8 A diagram illustrating how the exhaust gas purifier is arranged in layers above and below a deck.

An embodiment in which an exhaust gas purifier is installed in layers above and below a deck is described next with reference to FIG. 8. FIG. 8 illustrates the embodiment in which an exhaust gas purifier 31 is fixed onto a second deck 16 by using a through-hole 70 provided in the second deck 16.

As illustrated in FIG. 8, the through-hole 70 through which a casing 33 of the exhaust gas purifier 31 extends is provided in the second deck 16. Through the through-hole 70, the exhaust gas purifier 31 is arranged above and below the second deck 16. In the present embodiment, the above-described fixing member 60 is used in installing the plurality of exhaust gas purifiers 31 on the second deck 16. The present invention is not limited to this example. For example, each exhaust gas purifier 31 may be installed with a flange, which is provided for the fixing to the second deck 16, around the casing 33 rather than with the fixing member 60 so that the casing 33 is directly fixed to the second deck 16. Thus, such arrangement in layers above and below a deck affords efficient utilization of space above an upper deck.

Figure 9:
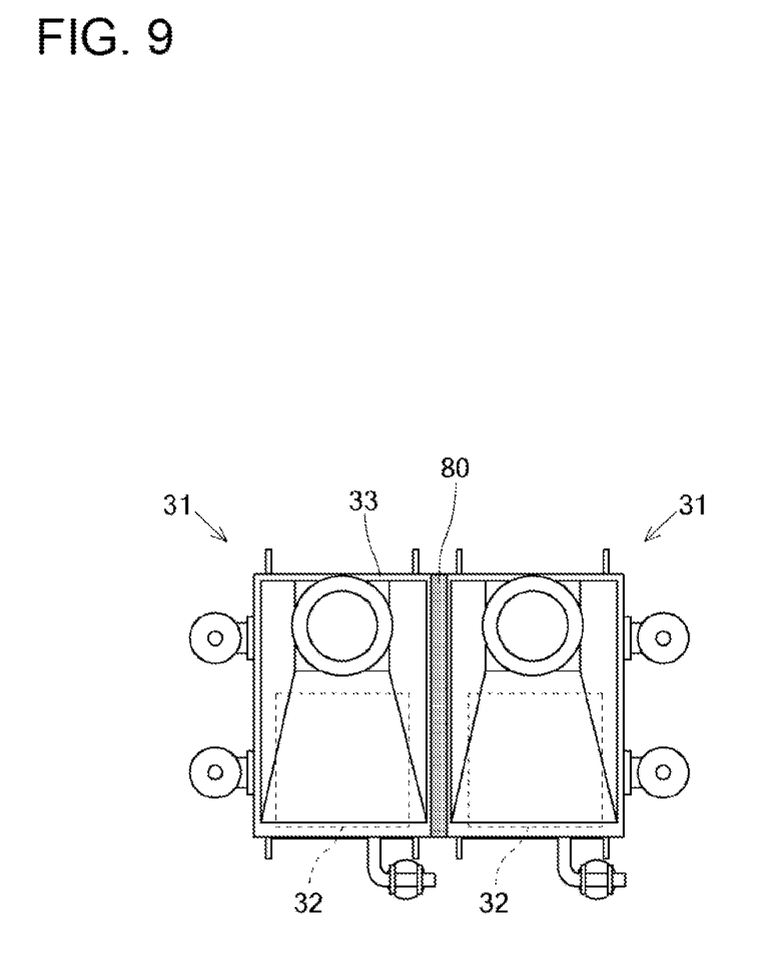
FIG. 9 A diagram illustrating an embodiment in which a casing is shared by adjacent exhaust gas purifiers.

An embodiment in which casings of a plurality of exhaust gas purifiers are integrated and shared is described next with reference to FIG. 9. FIG. 9 illustrates an embodiment in which two adjacent exhaust gas purifiers 31 have a shared casing 33, whose inside is partitioned by a thermal insulator 80 provided between the two exhaust gas purifiers 31.

As illustrated in FIG. 9, the respective casings 33 of the two exhaust gas purifiers 31 arranged adjacent to each other can be integrated. That is, a configuration in which the casing 33 is shared to accommodate the internal structures of the two exhaust gas purifiers 31 can also be employed. In this case, the thermal insulator 80 partitions the internal space of the casing 33 into two spaces and each of the spaces accommodates the internal structure of each exhaust gas purifier 31. Accordingly, heat transfer from one side to the other side can be avoided to inhibit reduction in the temperature of a NOx catalyst 32. Such sharing of the casing 33 by the adjacent exhaust gas purifiers 31 enables downsizing of the overall structure and can contribute to space saving.

Figure 10:
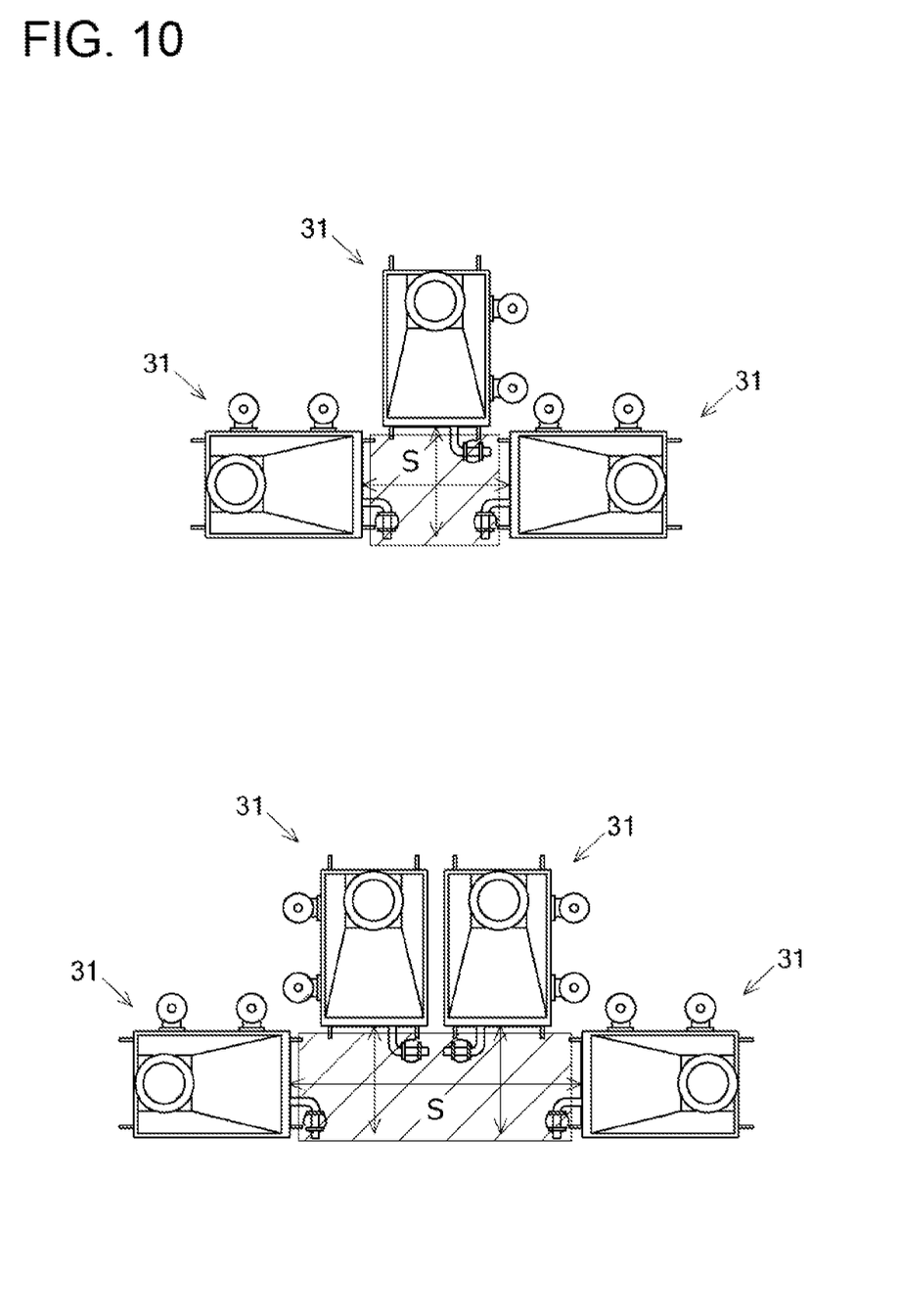
FIG. 10 A diagram illustrating other embodiments of the layout of the exhaust gas purifiers.

Other embodiments of the layout of a plurality of exhaust gas purifiers is described next with reference to FIG. 10. The upper part of FIG. 10 illustrates an embodiment in which three exhaust gas purifiers 31 are arranged in the shape of T. The lower part of FIG. 10 illustrates an embodiment in which four exhaust gas purifiers 31 are arranged in the shape of T.

As illustrated in FIG. 10, two of the plurality of exhaust gas purifiers 31 are arranged so that their front surfaces face each other. Further, at least two of the exhaust gas purifiers 31 are arranged so that their operation directions cross. Employing such a layout can minimize an operation area needed.

Although the above-described embodiments present examples in which the plurality of exhaust gas purifiers 31 are arranged so as to be orthogonal, the present invention is not limited to these examples. It is just required that the exhaust gas purifiers are arranged so that the respective openings of the exhaust gas purifiers face an identical space and that operation directions through the openings cross. For example, the exhaust gas purifiers can be arranged at a given angle relative to the horizontal direction. For example, the exhaust gas purifiers can be arranged so that the operation directions of at least two of the exhaust gas purifiers 31 cross while forming an angle of approximately 60°.

In addition, although the foregoing embodiments describe the exhaust gas purifiers 31 provided on the exhaust paths 30 of the dynamo engines 20 as examples, the present invention is not limited to these examples. The exhaust gas purifier according to the present invention can be provided on an exhaust path of the main engine 12.

INDUSTRIAL APPLICABILITY

The present invention is applicable to a ship with exhaust gas purifiers provided on exhaust paths of engines.

REFERENCE SIGNS LIST 1 ship
16 second deck
20 dynamo engine (engine)
30 exhaust path
31 exhaust gas purifier
32 NOx catalyst (purification catalyst)
33 casing
36 opening
60 fixing member
61 fixing hole
70 through-hole
A operation direction
S identical space

The invention claimed is:

1. A ship comprising:
a plurality of engines;
a plurality of exhaust gas purifiers provided on respective exhaust paths for exhaust gas from each engine of the plurality of engines, the plurality of exhaust gas purifiers including a first exhaust gas purifier and a second exhaust gas purifier; and
wherein:
each exhaust gas purifier of the plurality of exhaust gas purifiers includes a casing and an opening defined by the casing, the casing configured to include, within the casing, a purification catalyst for purifying the exhaust gas, and the opening serving to place the purification catalyst into or displace the purification catalyst from the casing;
a first opening of the first exhaust gas purifier defines a first plane;
a second opening of the second exhaust gas purifier defines a second plane;
a first line orthogonal to the first plane and extending away from the first exhaust gas purifier intersects at least a first portion of a space, the space defined by the first exhaust gas purifier, the second exhaust gas purifier, and a deck of a ship; and
a second line orthogonal to the second plane and extending away from the second exhaust gas purifier intersects at least a second portion of the space.

2. The ship according to claim 1, wherein the plurality of exhaust gas purifiers are arranged in layers above and below the deck of the ship.

3. The ship according to claim 1, wherein:
the plurality of exhaust gas purifiers are fixed by a fixing member for integrally installing the exhaust gas purifiers,
the fixing member includes a fixing hole for fixing each of the plurality of exhaust gas purifiers, and
each of the plurality of exhaust gas purifiers is fixed in the ship by the fixing member in a state where each of the plurality of exhaust gas purifiers is fixed in the fixing hole of the fixing member.

4. The ship according to claim 1, wherein the plurality of exhaust gas purifiers are arranged so that the respective openings of the plurality of exhaust gas purifiers face the same space.

5. The ship according to claim 1, wherein the first line intersects the second line.

6. An apparatus comprising:
a first casing configured to receive a first catalyst via a first opening positioned between a first end of the first casing and a second end of the first casing, the second end of the first casing downstream and opposite the first end of the first casing, the first casing configured to receive a first exhaust gas via an engine, define a first exhaust gas flow path including the first end of the first casing and the second end of the first casing, and position the first catalyst within the first exhaust gas flow path;
a second casing configured to receive a second catalyst via a second opening positioned between a first end of the second casing and a second end of the second casing, the second end of the second casing downstream and opposite the first end of the second casing, the second casing configured to receive a second exhaust gas via an engine, define a second exhaust gas flow path including the first end of the second casing and the second end of the second casing, and position the second catalyst within the second exhaust gas flow path; and
wherein:
the first opening of the first casing defines a first plane;
the second opening of the second casing defines a second plane;
a third plane orthogonal to the first plane and extending away from the first casing intersects at least a first portion of a space defined by the first casing, the second casing, and a deck of a ship; and
a fourth plane orthogonal to the second plane and extending away from the second casing intersect at least a second portion of the space.

7. The apparatus according to claim 6, wherein the third plane intersects the fourth plane.

8. The apparatus according to claim 6, further comprising the engine, and wherein the engine is a ship engine.

9. The apparatus according to claim 6, wherein:
the first casing is configured to receive the first exhaust gas from a first engine via the first end of the first casing; and
the second casing is configured to receive the second exhaust gas from a second engine via the first end of the second casing.

10. The apparatus according to claim 6, wherein the first opening is configured to receive the first catalyst via a path orthogonal to a flow direction of the first exhaust gas flow path.

11. The apparatus according to claim 6, wherein the second opening is configured to receive the second catalyst via a path orthogonal to a flow direction of the second exhaust gas flow path.

12. The apparatus according to claim 6, wherein:
the first casing is configured to define a first cavity; and
the second casing is configured to define a second cavity.

13. The apparatus according to claim 6, wherein:
the first opening includes a first plurality of openings, the first plurality of openings interposed between a first deck of a ship and a second deck of the ship; and
the second opening includes a second plurality of openings, the second plurality of openings interposed between the first deck and the second deck.

14. The apparatus according to claim 6, wherein:
the first casing and the second casing are configured to be coupled to a deck of a ship via a plate; and
the plate includes a first surface and a second surface opposite the first surface, the first surface configured to be coupled to the first casing and the second casing, the second surface configured to be coupled to the deck.

15. The apparatus according to claim 14, wherein the plate is configured to define at least a first opening and a second opening, the first opening configured to receive the first casing and the second opening configured to receive the second casing.

16. The apparatus according to claim 14, wherein:
the first casing includes a first flange coupled to the first casing and configured to be coupled to the first surface of the plate; and
the second casing includes a second flange coupled to the second casing and configured to be coupled to the first surface of the plate.

17. A method comprising:
receiving a first catalyst via a first opening of a first casing, the first opening positioned between a first end of the first casing and a second end of the first casing, the first opening configured to define a first plane;

receiving a second catalyst via a second opening of a second casing, the second opening positioned between a first end of the second casing and a second end of the second casing, the second opening configured to define a second plane, wherein:
- a first line orthogonal to the first plane and extending away from the first casing intersects at least a first portion of a space defined by the first casing, the second casing, and a deck of a ship; and
- a second line orthogonal to the second plane and extending away from the second casing intersects at least a second portion of the space;

receiving a first exhaust gas from a first engine at the first casing and routing the first exhaust gas via a first flow path defined by the first casing, the first flow path including the first end of the first casing, to the first catalyst, and to a second end of the first casing; and receiving a second exhaust gas from a second engine at the second casing and routing the second exhaust gas via a second flow path defined by the second casing, the second flow path including the first end of the second casing, to the second catalyst, and to a second end of the second casing.

18. The method according to claim 17, wherein the first line intersects the second line, or the first portion and the second portion are the same portion.

19. The method according to claim 17, wherein the first catalyst is received via a first path orthogonal to a flow direction of the first exhaust gas, and the second catalyst is received via a second path orthogonal to a flow direction of the second exhaust gas.

20. The method according to claim 17, further comprising removing the first catalyst from the first casing via the first opening.

* * * * *